(12) United States Patent
Oya et al.

(10) Patent No.: US 10,011,733 B2
(45) Date of Patent: Jul. 3, 2018

(54) ANTI-FOGGING COATED TRANSPARENT ARTICLE

(71) Applicant: Nippon Sheet Glass Company, Limited, Tokyo (JP)

(72) Inventors: Kazuaki Oya, Kanagawa (JP); Kazutaka Kamitani, Nara (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/316,045

(22) PCT Filed: Jun. 3, 2015

(86) PCT No.: PCT/JP2015/002818
§ 371 (c)(1),
(2) Date: Dec. 2, 2016

(87) PCT Pub. No.: WO2015/186360
PCT Pub. Date: Dec. 10, 2015

(65) Prior Publication Data
US 2017/0096574 A1    Apr. 6, 2017

(30) Foreign Application Priority Data

Jun. 5, 2014 (JP) ................. 2014-116702
Jun. 5, 2014 (JP) ................. 2014-116703
Jan. 16, 2015 (JP) ................. 2015-006931

(51) Int. Cl.
| | | |
|---|---|---|
| C09D 129/14 | (2006.01) | |
| C03C 17/32 | (2006.01) | |
| C09D 7/12 | (2006.01) | |
| C09D 7/40 | (2018.01) | |
| C09D 7/63 | (2018.01) | |
| C09D 7/61 | (2018.01) | |

(52) U.S. Cl.
CPC ............ *C09D 129/14* (2013.01); *C03C 17/32* (2013.01); *C09D 7/1216* (2013.01); *C09D 7/1233* (2013.01); *C09D 7/1266* (2013.01); *C09D 7/61* (2018.01); *C09D 7/63* (2018.01); *C09D 7/67* (2018.01); *C03C 2217/445* (2013.01); *C03C 2217/478* (2013.01); *C03C 2217/76* (2013.01)

(58) Field of Classification Search
None
See application file for complete search history.

(56) References Cited

U.S. PATENT DOCUMENTS

| | | | | |
|---|---|---|---|---|
| 6,420,020 B1* | 7/2002 | Yamazaki | ............ | C03C 17/007 |
| | | | | 427/163.4 |
| 2013/0302599 A1* | 11/2013 | Oya | ................ | C09D 5/1618 |
| | | | | 428/336 |

FOREIGN PATENT DOCUMENTS

| | | |
|---|---|---|
| EP | 0051405 A1 | 5/1982 |
| JP | 62148535 | 7/1987 |
| JP | 2001146585 | 5/2001 |
| JP | 2001152137 | 6/2001 |
| JP | 2005314495 | 11/2005 |
| JP | 2012017394 | 1/2012 |
| JP | 2012117025 | 6/2012 |
| JP | 2013193043 | 9/2013 |

OTHER PUBLICATIONS

Machine-generated English-language translation of JP 2013-193043 A to Shimizu et al.*
Machine-generated English-language translation of JP 2012-017394 A to Hirano et al.*
International Search Report for PCT/JP2015/002818, dated Sep. 1, 2015, 5 pages including English translation.
Extended European Search Report issued for corresponding European Patent Application No. 15803607.9, dated Dec. 12, 2017, 6 pages.

* cited by examiner

*Primary Examiner* — Vu A Nguyen
(74) *Attorney, Agent, or Firm* — Hamre, Schumann, Mueller & Larson, P.C.

(57) ABSTRACT

Provided is an anti-fogging coated transparent article including an anti-fog film, the anti-fog film being a single-layer film containing a water-absorbent resin, a hydrophobic group, and a metal oxide component. The hydrophobic group is a chain or cyclic alkyl group having 1 to 30 carbon atoms, preferably a linear alkyl group having 6 to 14 carbon atoms, in which at least one hydrogen atom is optionally substituted by a fluorine atom. The hydrophobic group is bonded directly to a metal atom of the metal oxide component. The anti-fog film contains, for example, the metal oxide component in an amount of 0.01 to 60 parts by mass and the hydrophobic group in an amount of 0.05 to 10 parts by mass per 100 parts by mass of the water-absorbent resin. The water-absorbent resin is, for example, polyvinyl acetal.

30 Claims, No Drawings

ANTI-FOGGING COATED TRANSPARENT ARTICLE

TECHNICAL FIELD

The present invention relates to an anti-fogging coated transparent article including a transparent article and an anti-fog film formed on the transparent article, and more particularly relates to an anti-fogging coated transparent article including an anti-fog film containing a water-absorbent resin.

BACKGROUND ART

Anti-fogging coated transparent articles include anti-fog mirrors used in bathrooms or lavatories and anti-fog windows used in openings of vehicles. Known examples of anti-fog films include films containing a water-absorbent resin such as polyvinyl acetal.

Anti-fog films containing a water-absorbent resin have poor strength properties and are susceptible to surface damage, particularly when they have absorbed water. To address this problem, it has conventionally been proposed to add a layer for surface protection to improve the film strength properties. For example, Patent Literature 1 discloses a two-layered anti-fog film including a water-absorbent layer containing a water-absorbent resin and a water-permeable protective layer formed on the water-absorbent layer. The water-absorbent layer contains polyvinyl acetal and a hydrolysate or partial hydrolysate of alkylsilyl isocyanate. The protective layer is formed of a hydrolysate or partial hydrolysate of alkylsilyl isocyanate. Patent Literature 1 specifies for the water-absorbent layer and the protective layer that the number of carbon atoms in the alkyl group of the alkylsilyl isocyanate is 1 or 2 (claims 1 and 3).

For another example, Patent Literature 2 discloses a two-layered anti-fog film including a water-absorbent layer containing a water-absorbent resin and a water-repellent layer formed on the water-absorbent layer. The water-repellent layer is formed using a compound having a methyl group and an isocyanate group (paragraph [0031]).

Patent Literature 3 discloses a single-layer anti-fog film. This anti-fog film contains a water-absorbent resin, a colloidal silica (fine silica particles), and a silica derived from a hydrolysate or partial hydrolysate of silicon alkoxide, at a predetermined ratio. Tetraalkoxysilane is disclosed as the silicon alkoxide. Despite being a single-layer film, this anti-fog film has improved strength properties by virtue of the addition of the inorganic component such as fine silica particles.

CITATION LIST

Patent Literature

Patent Literature 1: JP 2001-146585 A
Patent Literature 2: JP 2001-152137 A
Patent Literature 3: JP 2012-117025 A

SUMMARY OF INVENTION

Technical Problem

Anti-fog films have been required to have both good anti-fog properties and good strength properties such as, in particular, abrasion resistance and wear resistance. It is therefore an object of the present invention to provide a transparent article including an anti-fog film suitable for achieving both good strength properties and good anti-fog properties.

Solution to Problem

In a first aspect, the present invention provides an anti-fogging coated transparent article including a transparent article and an anti-fog film formed on the transparent article. The anti-fog film is a single-layer film containing a water-absorbent resin, a hydrophobic group, and a metal oxide component. The hydrophobic group is a chain or cyclic alkyl group having 1 to 30 carbon atoms in which at least one hydrogen atom is optionally substituted by a fluorine atom. The hydrophobic group is bonded directly to a metal atom of the metal oxide component.

In a second aspect, the present invention provides an anti-fogging coated transparent article including a transparent article and an anti-fog film formed on the transparent article, the anti-fog film containing polyvinyl acetal, a silica component, and a metal atom other than a silicon atom. The silica component is derived from a hydrolyzable silicon compound, or a hydrolysate of the hydrolyzable silicon compound, added to a coating liquid for forming the anti-fog film. The metal atom other than a silicon atom is derived from an organometallic compound added to the coating liquid.

Advantageous Effects of Invention

It has been found that both good strength properties and good anti-fog properties of an anti-fog film can easily be achieved by incorporating a hydrophobic group and a metal oxide component, together with a water-absorbent resin, into the anti-fog film in such a manner that the hydrophobic group is directly bonded to a metal atom of the metal oxide component. It has also been found that both good strength properties and good anti-fog properties of an anti-fog film can easily be achieved by having the anti-fog film contain: polyvinyl acetal; a silica component derived from a hydrolyzable silicon compound or its hydrolysate; and a metal atom, other than a silicon atom, which is derived from an organometallic compound. The present invention makes it possible to provide an anti-fogging coated transparent article excellent both in film strength properties typified by abrasion resistance and wear resistance and in anti-fog properties.

DESCRIPTION OF EMBODIMENTS

Hereinafter, embodiments of the present invention will be described. It should be noted that the following description is not intended to limit the present invention to particular embodiments.

The term "hydrophobic group" as used in the following description refers to a chain or cyclic alkyl group having 1 to 30 carbon atoms in which at least one hydrogen atom is optionally substituted by a fluorine atom. The term "metal oxide component" is intended to encompass not only a component consisting only of a metal atom and an oxygen atom bonded to each other but also a moiety containing a metal atom and an oxygen atom bonded directly to each other. That is, for example, the moiety MO in a component represented by the formula R-M-O (R is a hydrophobic group and M is a metal atom) corresponds to a metal oxide component. The word "metal" used in the terms such as "metal oxide component", "metal atom", and "metal compound" is intended to encompass boron (B) and silicon (Si), as is conventional.

First Embodiment—Hydrophobic Group

An anti-fogging coated transparent article according to the present embodiment includes a transparent article and a single-layer anti-fog film formed on the surface of the transparent article. The anti-fog film contains a hydrophobic group.

[Transparent Article]

The transparent article is not required to have a particular form. A suitable example of the transparent article is a transparent substrate which is typically a resin sheet or a glass sheet. A preferred transparent substrate is a glass sheet having high surface hardness.

(Glass Sheet)

The glass sheet may be, for example, a float glass sheet which is a type of the glass sheets most commonly used in the vehicle industry, the building industry, and other various industrial fields. The glass sheet need not be colored, but may be colored green or bronze, for example. The glass sheet may be treated or processed into strengthened glass, laminated glass, double-glazed glass, or the like. The principal surfaces of the glass sheet may be either flat or curved. The thickness of the sheet is, for example, 1 to 12 mm. It is preferable that the thickness be 3 to 10 mm for use in buildings and 1 to 5 mm for use in vehicles.

When a glass sheet is used in a vehicle window pane, a ceramic shielding layer may be formed on the edges of the vehicle window pane to improve the aesthetic quality of the vehicle. The ceramic shielding layer serves also to prevent ultraviolet-induced degradation of a resin material such as a foam or an adhesive for joining the window pane to the body of the vehicle. The ceramic shielding layer is formed by applying and sintering a ceramic paste. The article of the present invention may be a glass sheet provided with such a ceramic shielding layer.

(Resin Sheet)

A suitable example of the resin sheet is a polycarbonate sheet or an acrylic resin sheet which is typically a polymethyl methacrylate sheet. The thickness of the resin sheet is suitably 2 to 8 mm and preferably 3 to 6 mm. The surface of the resin sheet may be subjected to a surface treatment for increasing the adhesion to the anti-fog film. Examples of the surface treatment of the resin sheet include: oxidation treatments such as corona discharge treatment, plasma treatment, chromic acid treatment (wet process), flame treatment, hot-air treatment, and ozone and ultraviolet radiation treatment; and roughening treatments such as sandblasting and solvent treatment. Among these treatments, the corona discharge treatment is preferred in terms of effect and ease of handling.

(Mirror)

The transparent article may be a mirror having one principal surface provided with a reflective film. The above glass sheet or resin sheet can be used as a transparent substrate of the mirror. In this case, it is preferable for the anti-fog film to be formed on a principal surface of the transparent substrate opposite to the principal surface provided with the reflective film. The anti-fogging coated mirror can be used as a so-called anti-fog mirror.

[Anti-Fog Film]

In the first embodiment, the anti-fog film is a single-layer film formed on the surface of the transparent article. The anti-fog film, which is a single-layer film, contains at least a water-absorbent resin, a hydrophobic group, and a metal oxide component. The anti-fog film may further contain another functional component if necessary. The type of the water-absorbent resin is not particularly limited, as long as the resin is capable of absorbing and retaining water. The hydrophobic group can be introduced into the anti-fog film from a metal compound having the hydrophobic group (hydrophobic group-containing metal compound). The metal oxide component can be introduced into the anti-fog film, for example, from the hydrophobic group-containing metal compound, another metal compound, or fine metal oxide particles. Each of the above components will now be described.

(Water-Absorbent Resin)

Examples of the water-absorbent resin include hydroxypropyl cellulose, polyvinyl alcohol, polyvinylpyrrolidone, polyvinyl acetal, and polyvinyl acetate. It is preferable for the water-absorbent resin to include polyvinyl acetal.

The polyvinyl acetal can be obtained by acetalization of polyvinyl alcohol through condensation reaction of polyvinyl alcohol with an aldehyde. The acetalization of polyvinyl alcohol may be carried out by any of commonly-known methods such as a precipitation method which uses an aqueous medium in the presence of an acid catalyst and a dissolution method which uses a solvent such as an alcohol. The acetalization can be carried out in parallel with saponification of polyvinyl acetate. It is preferable that the degree of acetalization be 2 to 40 mol %, even 3 to 30 mol %, particularly 5 to 20 mol %, or in some cases 5 to 15 mol %. The degree of acetalization can be measured, for example, with $^{13}C$ nuclear magnetic resonance spectrometry. Polyvinyl acetal having a degree of acetalization in the above range is suitable for formation of an anti-fog film that has good water absorbency and water resistance.

The average degree of polymerization of the polyvinyl alcohol is preferably 200 to 4500 and more preferably 500 to 4500. A higher average degree of polymerization is more advantageous for forming an anti-fog film having good water absorbency and water resistance. If, however, the average degree of polymerization is too high, a solution of the polyvinyl alcohol will have too high a viscosity, which may adversely affect the formation of the film. It is suitable that the degree of saponification of the polyvinyl alcohol be 75 to 99.8 mol %.

Examples of the aldehyde to be subjected to condensation reaction with the polyvinyl alcohol include aliphatic aldehydes such as formaldehyde, acetaldehyde, butyraldehyde, hexylcarbaldehyde, octylcarbaldehyde, and decylcarbaldehyde. Other examples include: benzaldehyde; alkyl-substituted benzaldehydes such as 2-methylbenzaldehyde, 3-methylbenzaldehyde, and 4-methylbenzaldehyde; halogen-substituted benzaldehydes such as chlorobenzaldehyde; substituted benzaldehydes in which a hydrogen atom is substituted by a functional group other than alkyl groups, such as a hydroxy, alkoxy, amino, or cyano group; and aromatic aldehydes such as condensed-ring aromatic aldehydes such as naphthaldehyde and anthraldehyde. Aromatic aldehydes, which have high hydrophobicity, are advantageous for forming an anti-fog film having a low degree of acetalization and high water resistance. The use of an aromatic aldehyde is advantageous also for forming a highly water-absorbent film by allowing a large amount of hydroxy groups to remain. It is preferable for the polyvinyl acetal to contain an acetal structure derived from an aromatic aldehyde, in particular benzaldehyde.

The content of the water-absorbent resin in the anti-fog film is preferably 50 mass % or more, more preferably 60 mass % or more, and particularly preferably 65 mass % or more, and is preferably 95 mass % or less, more preferably 90 mass % or less, and particularly preferably 85 mass % or less, in terms of the film hardness, water absorbency, and anti-fog properties.

(Hydrophobic Group)

To obtain the above effect of the hydrophobic group to a sufficient degree, it is preferable that the hydrophobic group used be a highly hydrophobic one. The hydrophobic group is preferably at least one selected from: (1) a chain or cyclic alkyl group having 3 to 30 carbon atoms; and (2) a chain or cyclic alkyl group having 1 to 30 carbon atoms in which at least one hydrogen atom is substituted by a fluorine atom (this alkyl group may hereinafter be referred to as a "fluorine-substituted alkyl group").

For (1) and (2), the chain or cyclic alkyl group is preferably a chain alkyl group. The chain alkyl group may be a branched alkyl group, but is preferably a linear alkyl group. An alkyl group having more than 30 carbon atoms may render the anti-fog film cloudy. In terms of the balance of the anti-fog properties, strength properties, and appearance of the film, the number of carbon atoms in the alkyl group is preferably 20 or less and more preferably 6 to 14. The alkyl group is particularly preferably a linear alkyl group having 6 to 14 carbon atoms, particularly 8 to 12 carbon atoms, and examples of such a linear alkyl group include an n-decyl group (which has 10 carbon atoms) and an n-dodecyl group (which has 12 carbon atoms). For (2), the fluorine-substituted alkyl group may be a chain or cyclic alkyl group in which only one or some of the hydrogen atoms are substituted by fluorine atoms. The fluorine-substituted alkyl group may be a chain or cyclic alkyl group in which all of the hydrogen atoms are substituted by fluorine atoms, and may be, for example, a linear perfluoroalkyl group. The fluorine-substituted alkyl group is highly hydrophobic, which is why the addition of a small amount of the fluorine-substituted alkyl group can provide a sufficient effect. If the content of the fluorine-substituted alkyl group is too high, the fluorine-substituted alkyl group may be separated from other components in a coating liquid for forming the film.

(Hydrolyzable Metal Compound Having Hydrophobic Group)

To incorporate a hydrophobic group into the anti-fog film, it is recommended to add a metal compound having the hydrophobic group (hydrophobic group-containing metal compound), in particular a metal compound having not only a hydrophobic group but also a hydrolyzable functional group or a halogen atom (hydrophobic group-containing hydrolyzable metal compound), or a hydrolysate of the metal compound, to the coating liquid for forming the film. In other words, the hydrophobic group may be one derived from the hydrophobic group-containing hydrolyzable metal compound. A suitable example of the hydrophobic group-containing hydrolyzable metal compound is a hydrophobic group-containing hydrolyzable silicon compound represented by the following formula (I).

$$R_mSiY_{4-m} \tag{I}$$

In this formula, R is a hydrophobic group, i.e., a chain or cyclic alkyl group having 1 to 30 carbon atoms in which at least one hydrogen atom is optionally substituted by a fluorine atom, Y is a hydrolyzable functional group or a halogen atom, and m is an integer of 1 to 3. The hydrolyzable functional group is, for example, at least one selected from an alkoxy group, an acetoxy group, an alkenyloxy group, and an amino group, and is preferably an alkoxy group, in particular an alkoxy group having 1 to 4 carbon atoms. The alkenyloxy group is, for example, an isopropenoxy group. The halogen atom is preferably chlorine. The functional groups mentioned as examples can be used also as the "hydrolyzable functional group" described later. It is preferable that m be 1 to 2.

The compound represented by the formula (I) yields a component represented by the following formula (II) upon full completion of hydrolysis and polycondensation.

$$R_mSiO_{(4-m)/2} \tag{II}$$

In this formula, R and m are as defined above. In actual cases, the compound represented by the formula (II) forms a network structure having silicon atoms bonded to each other via oxygen atoms in the anti-fog film after hydrolysis and polycondensation.

As described above, the compound represented by the formula (I) is hydrolyzed or partially hydrolyzed, and at least part of the hydrolysate is then polycondensed to form a siloxane bond (Si—O—Si) network in which silicon atoms and oxygen atoms are alternately linked and which extends in three dimensions. The hydrophobic groups R are linked to the silicon atoms contained in the network structure. In other words, the hydrophobic groups R are fixed in the siloxane bond network structure via the bonds R—Si. This structure is advantageous in terms of uniform distribution of the hydrophobic groups R over the film. The network structure may contain a silica component yielded from a silicon compound (e.g., a tetraalkoxysilane or a silane coupling agent) other than the hydrophobic group-containing hydrolyzable silicon compound represented by the formula (I). When a silicon compound having no hydrophobic group but having a hydrolyzable functional group or a halogen atom (non-hydrophobic group-containing hydrolyzable silicon compound) is added, together with the hydrophobic group-containing hydrolyzable silicon compound, to the coating liquid for forming the anti-fog film, a siloxane bond network structure can be formed which contains both a silicon atom bonded to the hydrophobic group and a silicon atom not bonded to the hydrophobic group. When such a structure is formed, the content of the hydrophobic group and the content of the metal oxide component in the anti-fog film can easily be adjusted independently of each other.

The hydrophobic group has the effect of increasing the water vapor permeability of the surface of the anti-fog film containing the water-absorbent resin and thus improving the anti-fog properties of the film. The two abilities, water absorbency and water repellency, conflict with each other. For this reason, in conventional cases, a water-absorbent material and a water-repellent material are separately used in different layers. The hydrophobic group serves to eliminate uneven distribution of water in the vicinity of the surface of the anti-fog layer and thus lengthen the time to the dew formation, thereby improving the anti-fog properties of the anti-fog film having a single-layer structure. This effect will now be described.

Water vapor having entered the anti-fog film containing the water-absorbent resin is hydrogen-bonded to hydroxy groups, for example, of the water-absorbent resin and is trapped in the form of bound water. As the amount of water vapor increases, the form of water vapor shifts from bound water to intermediate water (semi-bound water) and finally to free water which is trapped in voids within the anti-fog film. In the anti-fog film, the hydrophobic group inhibits the formation of hydrogen bonds and facilitates dissociation of the already-formed hydrogen bonds. Insofar as the content of the water-absorbent resin remains unchanged, no difference occurs in the number of hydroxy groups capable of forming hydrogen bonds in the film; however, the hydrophobic group reduces the rate of formation of hydrogen bonds. Thus, water can spread in the form of water vapor as far as the innermost side of the hydrophobic group-containing anti-fog film before the water is eventually trapped in any of the above forms in the film. In addition, water once trapped can be dissociated relatively easily, and can then move to the innermost side of the film in the form of water vapor. In consequence, the distribution of the content of retained water in the thickness direction of the film is relatively uniform from the vicinity of the surface of the film to the innermost side of the film. That is, the entire thickness of the anti-fog film can be effectively used to absorb water applied to the surface of the film. This reduces the formation of water droplets due to condensation on the surface and improves the anti-fog properties.

By contrast, in the case of a conventional anti-fog film containing no hydrophobic group, water vapor having entered the film is very readily trapped in the form of bound water, intermediate water, or free water. That is, water vapor having entered the film tends to be trapped in the vicinity of the surface of the film. In consequence, the water content of the film is extremely high in the vicinity of the surface and drastically decreases with decreasing distance to the innermost side of the film. That is, despite the fact that the innermost portion of the film still has the capacity to absorb water, the vicinity of the surface of the film is saturated with water so that water droplets are formed by condensation. This results in limited anti-fog properties.

When the hydrophobic group is introduced into the anti-fog film using the hydrophobic group-containing hydrolyzable silicon compound (see the formula (I)), a strong network structure of siloxane bonds (Si—O—Si) is formed. The formation of this network structure is advantageous not only in terms of improvement in wear resistance but also in terms of improvement in other properties such as hardness and water resistance.

It is recommended to add the hydrophobic group in such an amount that the water contact angle on the surface of the anti-fog film is 70 degrees or more, preferably 80 degrees or more, and more preferably 90 degrees or more. For the water contact angle, a value measured for 4 mg of a water droplet placed on the surface of the film is employed. It is preferable that the hydrophobic group be incorporated into the anti-fog film in such an amount that the water contact angle falls within the above range, particularly when the hydrophobic group used is a methyl or ethyl group which has somewhat low hydrophobicity. The upper limit of the contact angle of the water droplet is not particularly defined. The contact angle of the water droplet is, for example, 150 degrees or less, or, for example, 120 degrees or less, or may be even 100 degrees or less. It is preferable for the hydrophobic group to be contained so uniformly in the anti-fog film that the contact angle of the water droplet falls within the above range over the entire surface of the anti-fog film.

It is preferable for the anti-fog film to contain the hydrophobic group in an amount of 0.05 parts by mass or more, preferably 0.1 parts by mass or more, or more preferably 0.3 parts by mass or more, and 10 parts by mass or less, preferably 5 parts by mass or less, per 100 parts by mass of the water-absorbent resin.

(Metal Oxide Component)

The anti-fog film contains a metal oxide component. The metal oxide component is, for example, an oxide of at least one element selected from Si, Ti, Zr, Ta, Nb, Nd, La, Ce, and Sn, and is preferably an oxide of Si (silica component). It is preferable for the anti-fog film to contain the metal oxide component in an amount of 0.01 parts by mass or more, preferably 0.1 parts by mass or more, more preferably 0.2 parts by mass or more, even more preferably 1 part by mass or more, particularly preferably 5 parts by mass or more, in some cases 10 parts by mass or more, or, if necessary, 20 parts by mass or more, and 60 parts by mass or less, particularly 50 parts by mass or less, preferably 45 parts by mass or less, more preferably 40 parts by mass or less, even more preferably 35 parts by mass or less, particularly preferably 33 parts by mass or less, or in some cases 30 parts by mass or less, per 100 parts by mass of the water-absorbent resin. The metal oxide component is a component for obtaining a sufficient level of film strength properties, in particular abrasion resistance. However, if the content of the component is too high, the anti-fog properties of the film deteriorate.

At least a portion of the metal oxide component may be a metal oxide component derived from a hydrolyzable metal compound or its hydrolysate added to a coating liquid for forming the anti-fog film. The hydrolyzable metal compound is at least one selected from: (a) a metal compound having a hydrophobic group and a hydrolyzable functional group or a halogen atom (hydrophobic group-containing hydrolyzable metal compound); and (b) a metal compound having no hydrophobic group but having a hydrolyzable functional group or a halogen atom (non-hydrophobic group-containing hydrolyzable metal compound). The metal oxide component derived from (a) and/or (b) is an oxide of the metal element constituting the hydrolyzable metal compound. The metal oxide component may include a metal oxide component derived from fine metal oxide particles added to the coating liquid for forming the anti-fog film and a metal oxide component derived from a hydrolyzable metal compound or its hydrolysate added to the coating liquid. Also in this case, the hydrolyzable metal compound is at least one selected from the above compounds (a) and (b). The compound (b), that is, the hydrolyzable metal compound having no hydrophobic group may include at least one selected from a tetraalkoxysilane and a silane coupling agent. The fine metal oxide particles and the compound (b) will hereinafter be described, with omission of the description of the compound (a) which has already been described.

(Fine Metal Oxide Particles)

The anti-fog film may further contain fine metal oxide particles as at least a portion of the metal oxide component. The metal oxide constituting the fine metal oxide particles is, for example, an oxide of at least one element selected from Si, Ti, Zr, Ta, Nb, Nd, La, Ce, and Sn, and the fine metal oxide particles are preferably fine silica particles. The fine silica particles can be introduced into the film, for example, by adding a colloidal silica. The fine metal oxide particles have a high ability to transmit a stress imposed on the anti-fog film to the transparent article supporting the film and also have high hardness. The addition of the fine metal oxide particles is thus advantageous in terms of improvement in the wear resistance and abrasion resistance of the anti-fog film. Furthermore, the addition of the fine metal oxide particles to the anti-fog film leads to the formation of minute voids in sites which are in contact with or in the vicinity of the fine particles, and these voids allow water vapor to be more readily captured within the film. The addition of the fine metal oxide particles can thus make a beneficial contribution to improvement in anti-fog properties. The introduction of the fine metal oxide particles into the anti-fog film can be accomplished by adding the fine metal oxide particles formed beforehand to the coating liquid for forming the anti-fog film.

If the average particle diameter of the fine metal oxide particles is too large, the film may become cloudy, while if the average particle diameter is too small, the particles are prone to aggregation and difficult to uniformly disperse. In view of this, the preferred average particle diameter of the fine metal oxide particles is 1 to 20 nm, particularly 5 to 20 nm. The average particle diameter of the fine metal oxide particles as specified herein is that of the primary particles. The value of the average particle diameter of the fine metal oxide particles is determined as an average of particle diameters measured for 50 fine particles randomly selected from among fine particles observed with a scanning electron microscope. If the content of the fine metal oxide particles is too high, the overall water absorption capacity of the film diminishes, and the film could become cloudy. It is recommended to add the fine metal oxide particles in an amount of 0 to 50 parts by mass, preferably 1 to 30 parts by mass, more preferably 2 to 30 parts by mass, particularly preferably 5 to 25 parts by mass, or in some cases 10 to 20 parts by mass, per 100 parts by mass of the water-absorbent resin.

(Hydrolyzable Metal Compound Having No Hydrophobic Group)

The anti-fog film may contain a metal oxide component derived from a hydrolyzable metal compound having no hydrophobic group (non-hydrophobic group-containing hydrolyzable compound). The non-hydrophobic group-containing hydrolyzable metal compound is preferably a hydrolyzable silicon compound having no hydrophobic group. The hydrolyzable silicon compound having no hydrophobic group is, for example, at least one silicon compound selected from silicon alkoxide, chlorosilane, acetoxysilane, alkenyloxysilane, and aminosilane that have no hydrophobic group, and is preferably silicon alkoxide having no hydrophobic group. An example of the alkenyloxysilane is isopropenoxysilane.

The hydrolyzable silicon compound having no hydrophobic group may be a compound represented by the following formula (III).

$$SiY_4 \qquad (III)$$

As described above, Y is a hydrolyzable functional group and preferably at least one selected from an alkoxy group, an acetoxy group, an alkenyloxy group, an amino group, and a halogen atom.

The non-hydrophobic group-containing hydrolyzable metal compound is hydrolyzed or partially hydrolyzed, and at least part of the hydrolysate is then polycondensed to yield a metal oxide component in which metal atoms and oxygen atoms are bonded to each other. This component provides a strong joint between the fine metal oxide particles and the water-absorbent resin and can contribute to improvement in the properties such as wear resistance, hardness, and water resistance of the anti-fog film. It is recommended that the content of the metal oxide component derived from the hydrolyzable metal compound having no hydrophobic group be 0 to 40 parts by mass, preferably 0.1 to 30 parts by mass, more preferably 1 to 20 parts by mass, particularly preferably 3 to 10 parts by mass, or in some cases 4 to 12 parts by mass, per 100 parts by mass of the water-absorbent resin.

A preferred example of the hydrolyzable silicon compound having no hydrophobic group is a tetraalkoxysilane, more particularly a tetraalkoxysilane having an alkoxy group having 1 to 4 carbon atoms. The tetraalkoxysilane is, for example, at least one selected from tetramethoxysilane, tetraethoxysilane, tetra-n-propoxysilane, tetraisopropoxysilane, tetra-n-butoxysilane, tetraisobutoxysilane, tetra-sec-butoxysilane, and tetra-tert-butoxysilane.

If the content of the metal oxide (silica) component derived from the tetraalkoxysilane is too high, the anti-fog properties of the anti-fog film may deteriorate. One reason for this deterioration is that the anti-fog film has a reduced flexibility, which limits the swelling and shrinkage of the film accompanying absorption and release of water. It is recommended to add the metal oxide component derived from the tetraalkoxysilane in an amount of 0 to 30 parts by mass, preferably 1 to 20 parts by mass, more preferably 3 to 10 parts by mass, per 100 parts by mass of the water-absorbent resin.

Another preferred example of the hydrolyzable silicon compound having no hydrophobic group is a silane coupling agent. The silane coupling agent is a silicon compound having different reactive functional groups. It is preferable that at least one of the reactive functional groups be a hydrolyzable functional group. The silane coupling agent is, for example, a silicon compound having an epoxy group and/or an amino group and a hydrolyzable functional group. Preferred examples of the silane coupling agent include glycidyloxyalkyltrialkoxysilane and aminoalkyltrialkoxysilane. For these silane coupling agents, it is preferable that the number of carbon atoms in an alkylene group bonded directly to a silicon atom be 1 to 3. The glycidyloxyalkyl group and aminoalkyl group both contain a hydrophilic functional group (an epoxy or amino group) and thus are not hydrophobic as a whole, despite containing an alkylene group.

The silane coupling agent provides a strong bond between the water-absorbent resin as an organic component and the fine metal oxide particles etc. as an inorganic component, and can contribute to improvement in the properties such as wear resistance, hardness, and water resistance of the anti-fog film. If, however, the content of the metal oxide (silica) component derived from the silane coupling agent is too high, the anti-fog properties of the anti-fog film deteriorate, and the anti-fog film becomes cloudy in some cases. It is recommended to add the metal oxide component derived from the silane coupling agent in an amount of 0 to 10 parts by mass, preferably 0.05 to 5 parts by mass, more preferably 0.1 to 2 parts by mass, per 100 parts by mass of the water-absorbent resin.

(Cross-Linked Structure)

The anti-fog film may contain a cross-linked structure derived from a cross-linker, preferably from at least one cross-linker selected from an organoboron compound, an organotitanium compound, and an organozirconium compound. The introduction of the cross-linked structure improves the wear resistance, abrasion resistance, and water resistance of the anti-fog film. From another standpoint, the introduction of the cross-linked structure facilitates improving the durability of the anti-fog film without deteriorating its anti-fog properties.

When a cross-linked structure derived from a cross-linker is introduced into the anti-fog film that contains a silica component as the metal oxide component, the anti-fog film may contain, in addition to silicon, a metal atom other than a silicon atom which is preferably boron, titanium, or zirconium.

The type of the cross-linker is not particularly limited as long as the cross-linker allows cross-linking of the water-absorbent resin used. Examples of the organotitanium compound will only be mentioned now. The organotitanium compound is, for example, at least one selected from a titanium alkoxide, a titanium chelate compound, and a titanium acylate. Examples of the titanium alkoxide include titanium tetraisopropoxide, titanium tetra-n-butoxide, and titanium tetraoctoxide. Examples of the titanium chelate compound include titanium acetylacetonate, titanium ethyl acetoacetate, octylene glycol titanate, triethanolamine titanate, and titanium lactate. The titanium lactate may be an ammonium salt (titanium ammonium lactate). An example of the titanium acylate is titanium stearate. A preferred organotitanium compound is a titanium chelate compound, in particular titanium lactate.

A cross-linker preferred when the water-absorbent resin is polyvinyl acetal is an organotitanium compound, in particular titanium lactate.

(Other Optional Components)

An additive may further be incorporated into the anti-fog film. Examples of the additive include glycols such as glycerin and ethylene glycol which have the function of improving the anti-fog properties. The additive may be, for example, a surfactant, a leveling agent, an ultraviolet absorber, a colorant, an anti-foaming agent, or an anti-septic agent.

[Film Thickness]

The thickness of the anti-fog film can be adjusted as appropriate depending on the required anti-fog properties and other factors. The thickness of the anti-fog film is preferably 1 to 20 μm, more preferably 2 to 15 μm, and particularly preferably 3 to 10 μm.

[Formation of Anti-Fog Film]

The anti-fog film can be formed by applying a coating liquid for forming the anti-fog film to a transparent article such as a transparent substrate, drying the applied coating liquid, and, optionally, performing a treatment such as a high-temperature, high-humidity treatment. The solvent used for preparation of the coating liquid and the method for applying the coating liquid can be selected from conventionally-known materials and methods.

During the step of applying the coating liquid, the ambient relative humidity is preferably kept less than 40% or even 30% or less. Keeping the relative humidity low can prevent the film from excessively absorbing water from the ambient atmosphere. If a large amount of water is absorbed from the ambient atmosphere, the water residing in the matrix of the film could deteriorate the strength properties of the film.

The step of drying the coating liquid preferably includes an air drying step and a heat drying step involving heating. It is recommended to perform the air drying step by exposing the coating liquid to an atmosphere having a relative humidity kept less than 40% or even 30% or less. The air drying step can be performed as a non-heating step, that is, can be performed at room temperature. When the coating liquid contains a hydrolyzable silicon compound, the heat drying step causes a dehydration reaction involving the silanol groups contained, for example, in a hydrolysate of the silicon compound and the hydroxy groups present on the transparent article, so that a matrix structure (Si—O bond network) composed of silicon atoms and oxygen atoms develops.

To avoid decomposition of an organic substance such as the water-absorbent resin, it is recommended that the temperature employed in the heat drying step be not much higher than necessary. In this case, the appropriate heating temperature is 300° C. or lower and is, for example, 100 to 200° C., while the heating time is 1 minute to 1 hour.

In the formation of the anti-fog film, a high-temperature, high-humidity treatment step may optionally be performed. Performing the high-temperature, high-humidity treatment step can make it easier to achieve both good anti-fog properties and good film strength properties. The high-temperature, high-humidity treatment step can be accomplished, for example, by continuous exposure to an atmosphere having a temperature of 50 to 100° C. and a relative humidity of 60 to 95% for 5 minutes to 1 hour. The high-temperature, high-humidity treatment step may be performed after the application step and the drying step or may be performed after the application step and the air drying step but before the heat drying step. In the former case, the high-temperature, high-humidity treatment step may be followed by an additional heat treatment step. This additional heat treatment step can be accomplished, for example, by continuous exposure to an atmosphere having a temperature of 80 to 180° C. for 5 minutes to 1 hour.

The anti-fog film formed from the coating liquid may be washed and/or wiped with a wet cloth if necessary. Specifically, the surface of the anti-fog film may be exposed to running water or wiped with a water-impregnated cloth. Pure water is suitable as water used in these steps. It is recommended to avoid using a detergent-containing solution for washing. Such a step can remove dust or dirt attached to the surface of the anti-fog film, resulting in successful formation of a clean coating surface.

Second Embodiment—Metal Atom Other than Silicon Atom

The anti-fogging coated transparent article according to the present embodiment includes a transparent article and an anti-fog film formed on the surface of the transparent article. The anti-fog film contains a metal atom other than a silicon atom, and is preferably a single-layer film.

[Transparent Article]

The transparent article is as described in the first embodiment.

[Anti-Fog Film]

In the second embodiment, the anti-fog film contains at least polyvinyl acetal, a silica component derived from a hydrolyzable silicon compound or its hydrolysate, and a metal atom, other than a silicon atom, which is derived from an organometallic compound. The anti-fog film may further contain another functional component such as fine metal oxide particles if necessary. Polyvinyl acetal is a water-absorbent resin which absorbs and retains water. The anti-fog film may contain a cross-linked structure containing a metal atom other than a silicon atom. In this case, the cross-linked structure provides a further improvement in the abrasion resistance of the anti-fog film. Each of the components will now be described.

(Polyvinyl Acetal)

The polyvinyl acetal is as described in the first embodiment.

The content of the polyvinyl acetal in the anti-fog film of the present embodiment is 50 mass % or more, preferably 60 mass % or more, more preferably 70 mass % or more, and particularly preferably 75 mass % or more, and is 99.5 mass % or less, preferably 95 mass % or less, and more preferably 90 mass % or less, in terms of the film hardness, water absorbency, and anti-fog properties.

(Silica Component)

The anti-fog film contains a silica component derived from a hydrolyzable silicon compound or its hydrolysate added to the coating liquid for forming the film. The hydrolyzable silicon compound is hydrolyzed or partially hydrolyzed, and at least part of the hydrolysate is polycondensed to yield the silica component in which silicon atoms and oxygen atoms are bonded to each other. This silica component can contribute to improvement in the properties such as wear resistance, hardness, and water resistance of the anti-fog film. The hydrolyzable silicon compound is a silicon compound having a hydrolyzable functional group or a halogen atom. The hydrolyzable functional group is, for example, at least one selected from an alkoxy group, an acetoxy group, an alkenyloxy group, and an amino group, and is preferably an alkoxy group, in particular an alkoxy group having 1 to 4 carbon atoms. The alkenyloxy group is, for example, an isopropenoxy group. The halogen atom is preferably chlorine.

It is recommended that the silica component be contained in the anti-fog film in an amount of 0.01 parts by mass or more, preferably 0.1 parts by mass or more, more preferably 0.3 parts by mass or more, even more preferably 0.5 parts by mass or more, in some cases 1 part by mass or more, or, if necessary, 3 parts by mass or more, per 100 parts by mass of the polyvinyl acetal, and that the silica component be contained in the anti-fog film in an amount of 60 parts by mass or less, particularly 50 parts by mass or less, preferably 40 parts by mass or less, more preferably 30 parts by mass or less, even more preferably 20 parts by mass or less, in some cases 15 parts by mass or less, or, if necessary, 10 parts by mass or less, per 100 parts by mass of the polyvinyl acetal.

It is preferable for the hydrolyzable silicon compound to include the compound (SiY$_4$) represented by the above formula (III).

The compound represented by the formula (III) undergoes hydrolysis followed by polycondensation to yield a silica component represented by SiO$_2$. In actual cases, this silica component forms a network structure having silicon atoms bonded to each other via oxygen atoms in the anti-fog film.

The compound represented by the formula (III) is preferably a tetraalkoxysilane. The tetraalkoxysilane is as described in the first embodiment.

It is preferable for the hydrolyzable silicon compound to include a compound represented by the formula (IV) in addition to the compound represented by the formula (III).

$$L_mSiY_{4-m} \quad (IV)$$

In this formula, L is a chain or cyclic hydrocarbon group in which at least one hydrogen atom is optionally substituted. Y and m are as defined above.

L may be a hydrocarbon group such as a chain hydrocarbon group or particularly a linear hydrocarbon group which has 1 to 30 carbon atoms, more preferably 3 to 20 carbon atoms, and in which at least one hydrogen atom is optionally substituted. Examples of the chain hydrocarbon group include an alkyl group, an alkenyl group, and an alkynyl group. A preferred chain hydrocarbon group is a linear alkyl group. L may be a cyclic hydrocarbon group such as a cycloalkyl or phenyl group which has 3 to 20 carbon atoms and in which at least one hydrogen atom is optionally substituted. Examples of the functional group substituted for the hydrogen atom include an epoxy group, an amino group, a (meth)acryloxy group, a ureido group, a mercapto group, and an isocyanate group. The hydrogen atom may be substituted by a halogen atom such as chlorine or fluorine. L may be the hydrophobic group R described in the first embodiment.

The compound represented by the formula (IV) undergoes hydrolysis followed by polycondensation to yield a silica component represented by SiO$_{(4-m)/2}$. This silica component, together with SiO$_2$ yielded from the compound represented by the formula (III), forms a network structure having silicon atoms bonded to each other via oxygen atoms in the anti-fog film.

The compound represented by the formula (IV) may typically be a compound known as a silane coupling agent. The silane coupling agent is a silicon compound having different reactive functional groups and has, for example, an epoxy group and/or an amino group and a hydrolyzable functional group. Preferred examples of the silane coupling agent include glycidyloxyalkyltrialkoxysilane and aminoalkyltrialkoxysilane. For these alkylsilanes, it is preferable that the number of carbon atoms in an alkyl group bonded directly to a silicon atom be 1 to 3. The silane coupling agent increases the affinity between the polyvinyl acetal and the silica component.

The silicon compound represented by the formula (III) has four hydrolyzable functional groups and is thus more suitable for forming a strong network structure than the silicon compound represented by the formula (IV) which has three hydrolyzable functional groups. In view of this, it is desirable that, when the silicon compound represented by the formula (IV) is used, the silicon compound represented by the formula (III) be contained in a larger amount than the silicon compound represented by the formula (IV) as compared by the number of silicon atoms. Specifically, it is preferable that a ratio N$_{Si(IV)}$/N$_{Si(T)}$ be 0.01 to 0.4 or even 0.1 to 0.35, where N$_{Si(IV)}$ represents the number of silicon atoms contained in the compound represented by the formula (IV) and N$_{Si(T)}$ represents the total of the number N$_{Si(III)}$ of silicon atoms contained in the compound represented by the formula (III) and the number N$_{Si(IV)}$ of silicon atoms contained in the compound represented by the formula (IV).

(Metal Atom Other than Silicon Atom)

The anti-fog film contains a metal atom other than a silicon atom. It is preferable that a cross-linked structure containing the metal atom be introduced in the anti-fog film. The cross-linked structure can contribute to improvement in the properties such as wear resistance, abrasion resistance, and water resistance of the anti-fog film. The metal atom other than a silicon atom is, for example, at least one selected from boron, titanium, and zirconium, in particular at least one selected from titanium and zirconium.

The cross-linked structure can be introduced into the anti-fog film by adding a cross-linker to the coating liquid for forming the anti-fog film. A preferred cross-linker is at least one selected from an organoboron compound, an organotitanium compound, and an organozirconium compound, and particularly preferred is an organotitanium compound. The organotitanium compound is, for example, at least one selected from a titanium alkoxide, a titanium chelate compound, and a titanium acylate. Examples of the titanium alkoxide include titanium tetraisopropoxide, titanium tetra-n-butoxide, and titanium tetraoctoxide. Examples of the titanium chelate compound include titanium acetylacetonate, titanium ethyl acetoacetate, octylene glycol titanate, triethanolamine titanate, and titanium lactate. The titanium lactate may be an ammonium salt (titanium ammonium lactate). An example of the titanium acylate is titanium stearate. A preferred organotitanium compound is a titanium chelate compound, in particular titanium lactate.

In the case of a conventional anti-fog film, the improvement in the strength properties, in particular abrasion resistance, of the anti-fog film is attempted by incorporating a silica component into the film. A silica component derived from a hydrolyzable silicon compound is known to form a strong network structure. The introduction of the silica component improves the abrasion resistance of the anti-fog film indeed, but hardens the film and consequently limits the polymer chain movement accompanying water absorption. Thus, when the film strength properties are improved only by the incorporation of the silica component, the anti-fog properties significantly deteriorate. Even when fine metal oxide particles are added together with the silica component, it is difficult to achieve both good anti-fog properties and good strength properties of the film. By contrast, the introduction of a cross-linked structure containing a metal atom other than a silicon atom is suitable for improving the strength properties of the film while avoiding the hardening of the film which leads to limitation of the polymer chain movement. The introduction of both the silica component and the cross-linked structure makes it possible to obtain an anti-fog film that is excellent in both the film strength properties and anti-fog properties.

It is recommended that the metal atom other than a silicon atom which is contained in the cross-linked structure be contained in the anti-fog film in an amount of 0.01 parts by mass or more, preferably 0.05 parts by mass or more, more preferably 0.1 parts by mass or more, even more preferably 1 part by mass or more, per 100 parts by mass of the polyvinyl acetal, and that the metal atom be contained in the anti-fog film in an amount of 50 parts by mass or less, preferably 40 parts by mass or less, more preferably 20 parts by mass or less, even more preferably 10 parts by mass or less, or in some cases 5 parts by mass or less, per 100 parts by mass of the polyvinyl acetal.

(Fine Metal Oxide Particles)

The anti-fog film may further contain fine metal oxide particles. The type of the metal oxide constituting the fine metal oxide particles, their effect, the method for introducing them into the film, their preferred average particle diameter, and their appropriate content are as described in the first embodiment.

(Other Optional Components, Film Thickness, and Film Formation)

Other optional components that may be contained in the anti-fog film, the thickness of the anti-fog film, and the method for forming the anti-fog film are also as described in the first embodiment.

EXAMPLES

Hereinafter, the present invention will be described in more detail with reference to examples. The present invention is not limited by the examples given below. The methods used to evaluate various characteristics will first be described.

(1) Appearance

Each anti-fogging coated article (anti-fog article) was visually examined for the level of transparency and the presence of crack, and evaluation was made according to the following criteria.

Good: Appearance was good.

Average: Slight cloudiness was observed.

Poor: Unevenness, cloudiness, and/or crack, which would be problematic in practical use, was observed in the film.

(2) Film Thickness

Each anti-fog article was left in an environment with a room temperature of 20° C. and a relative humidity of 50% for 1 hour, after which the thickness of the anti-fog film was measured using a surface profilometer, α-Step 500, manufactured by KLA-Tencor Corporation.

(3) Contact Angle

Each anti-fog article was left in an environment with a room temperature of 20° C. and a relative humidity of 50% for 1 hour, after which about 4 μL (=4 mg) of a water droplet was put on the surface of the anti-fog film to measure the contact angle of the water droplet on the surface of the anti-fog film using a contact angle meter (CA-A) manufactured by Kyowa Interface Science Co., Ltd.

(4) Anti-Fog Properties

Each anti-fog article was left in an environment with a room temperature of 20° C. and a relative humidity of 30% for 1 hour. In addition, hot water was put in a constant temperature water bath, the anti-fog article was placed above the hot water maintained at 40° C., with the anti-fog film being exposed to water vapor, and the time taken for the anti-fog film to fog was measured. In the case of a glass sheet (soda-lime glass sheet) provided with no anti-fog film, fog was observed in 10 seconds or less. The time to the formation of fog was evaluated according to the following criteria.

Excellent: Fog was observed after more than 85 seconds.

Good: Fog was observed after more than 60 seconds but in 85 seconds or less.

Average: Fog was observed after more than 30 seconds but in 60 seconds or less.

Poor: Fog was observed in 30 seconds or less.

(5) Repeatability of Anti-Fog Properties

Each anti-fog article was left in a low-temperature thermostat set at 0° C. for 20 minutes, then taken out to an environment with a room temperature of 20° C. and a relative humidity of 50%, and left in this environment until dew drops on the surface of the anti-fog film disappeared. This cycle was repeated 10 times, after which the anti-fog properties were evaluated in the same manner as in (4).

(6) Resistance to Wiping with Dry Cloth

A flannel cloth (#300) was attached to a reciprocating wear tester ("HEIDON-18", manufactured by SHINTO Scientific Co., ltd.), and the flannel cloth was reciprocated 1000 times on the surface of the anti-fog film of each anti-fog article under a load of 0.25 kg/cm$^2$. After that, the appearance of the surface of the film was visually observed and evaluated according to the following criteria.

Excellent: There was no change in appearance.

Good: Unclear, very shallow scratches were faintly observable.

Average: Clear scratches were visually observable.

Poor: Peeling off of the anti-fog film was observed.

(7) Resistance to Wiping with Wet Cloth

A flannel cloth (#300) was attached to a reciprocating wear tester ("HEIDON-18", manufactured by SHINTO Scientific Co., ltd.), and this flannel cloth was impregnated with 2 cm$^3$ of distilled water. The flannel cloth was reciprocated 1000 times on the surface of the anti-fog film of each anti-fog article under a load of 0.25 kg/cm$^2$. After that, the appearance of the surface of the film was visually observed and evaluated according to the following criteria.

Good: There was no significant change found in appearance.

Average: Cloudiness was observed, or less than ⅓ of the tested portion of the anti-fog film peeled off.

Poor: ⅓ or more of the tested portion of the anti-fog film peeled off.

(8) Wear Resistance

Taber Abraser "5130", manufactured by TABER INDUSTRIES, was used to conduct a wear test with a 250 g load at 500 rotations, and the amount of change in haze, ΔHz (%), caused by the test was measured. The haze was measured using a haze meter ("HZ-1S", manufactured by Suga Test Instruments Co., Ltd.). The wear resistance was evaluated according to the following criteria.

Criteria for Evaluation of Examples and
Comparative Examples of Series A

Good: ΔHz was 7% or less.
Poor: ΔHz was more than 7%, and/or the film peeled off.

Criteria for Evaluation of Examples, Comparative
Examples, and Reference Examples of Series B Excellent: ΔHz was 6% or less.
Good: ΔHz was more than 6% and 10% or less.
Poor: ΔHz was more than 10%, and/or the film peeled off.
<Series A: Introduction of Metal Atom Other than Silicon Atom>

Example A1

In a glass container were placed 62.5 mass % of a polyvinyl acetal resin-containing solution ("S-LEC KX-5" manufactured by Sekisui Chemical Co., Ltd., having a solids content of 8 mass %, having a degree of acetalization of 9 mol %, and containing an acetal structure derived from benzaldehyde), 1.04 mass % of tetraethoxysilane (TEOS, "KBE-04" manufactured by Shin-Etsu Chemical Co., Ltd.), 1.21 mass % of titanium lactate ("ORGATIX TC-310" manufactured by Matsumoto Fine Chemical Co., Ltd.; a solution containing 44 mass % of $Ti(OH)_2[OCH(CH_3)COOH]_2$ in a mixed solvent of 2-propanol and water), 17.79 mass % of an alcohol solvent ("SOLMIX AP-7" manufactured by Japan Alcohol Corporation), 17.44 mass % of purified water, 0.01 mass % of nitric acid as an acid catalyst, and 0.01 mass % of a leveling agent ("KP-341" manufactured by Shin-Etsu Chemical Co., Ltd.), which were stirred at room temperature (25° C.) for 3 hours to prepare a coating liquid for anti-fog film formation.

Next, the coating liquid was applied to a washed float glass sheet (soda-lime silicate glass with a thickness of 3.1 mm and a size of 100×100 mm) by flow coating in an environment with a room temperature of 20° C. and a relative humidity of 30%. After drying in this environment for 10 minutes, a heating treatment (preheating) was carried out at 120° C. This was followed by a high-temperature, high-humidity treatment using the atmosphere and time as specified above, and then by an additional heat treatment using the atmosphere and time as specified above. An anti-fog article was thus fabricated.

Example A2

The preparation of a coating liquid and the fabrication of an anti-fog article were performed in the same manner as in Example A1, except that 3.75 mass % of a fine silica particle dispersion ("SNOWTEX OS" manufactured by Nissan Chemical Industries, Ltd. and having a solids content of 20 mass %, the average particle diameter (primary particle diameter) being 10 nm) was further added, that the amount of the alcohol solvent added was 17.04 mass %, and that the amount of the purified water added was 14.44 mass %.

Example A3

The preparation of a coating liquid and the fabrication of an anti-fog article were performed in the same manner as in Example A1, except that 5.00 mass % of a fine niobium oxide particle dispersion ("BIRAL Nb-X10" manufactured by Taki Chemical Co., Ltd. and having a solids content of 10 mass %) was further added, that the amount of the alcohol solvent added was 16.94 mass %, and that the amount of the purified water added was 13.29 mass %.

Example A4

The preparation of a coating liquid and the fabrication of an anti-fog article were performed in the same manner as in Example A1, except that 2.50 mass % of a fine zirconium oxide particle dispersion ("BIRAL Zr-C20" manufactured by Taki Chemical Co., Ltd. and having a solids content of 20 mass %) was further added, that the amount of the alcohol solvent added was 17.29 mass %, and that the amount of the purified water added was 15.44 mass %.

Example A5

The preparation of a coating liquid and the fabrication of an anti-fog article were performed in the same manner as in Example A1, except that 0.17 mass % of a fine tin oxide particle dispersion ("CELNAX CX-S 301H" manufactured by Nissan Chemical Industries, Ltd. and having a solids content of 30 mass %) was further added, that the amount of the alcohol solvent added was 17.73 mass %, and that the amount of the purified water added was 17.33 mass %.

Example A6

The preparation of a coating liquid and the fabrication of an anti-fog article were performed in the same manner as in Example A2, except that 0.14 mass % of 3-glycidoxypropyltrimethoxysilane (GPTMS, "KBM-403" manufactured by Shin-Etsu Chemical Co., Ltd.) was further added, that the amount of the alcohol solvent added was 16.90 mass %, and that the amount of the purified water added was 14.44 mass %.

Example A7

The preparation of a coating liquid and the fabrication of an anti-fog article were performed in the same manner as in Example A1, except that the amount of the polyvinyl acetal resin-containing solution added was 50.0 mass %, that 0.35 mass % of 3-glycidoxypropyltrimethoxysilane (GPTMS, "KBM-403", manufactured by Shin-Etsu Chemical Co., Ltd.) and 7.50 mass % of a fine silica particle dispersion were further added, that the amount of the tetraethoxysilane added was 2.60 mass %, that the amount of the titanium lactate added was 1.20 mass %, that the amount of the alcohol solvent added was 20.01 mass %, that the amount of the purified water added was 18.32 mass %, and that 0.01 mass % of acetic acid was used instead of 0.01 mass % of nitric acid.

Example A8

The preparation of a coating liquid and the fabrication of an anti-fog article were performed in the same manner as in Example A1, except that the amount of the polyvinyl acetal resin-containing solution added was 50.0 mass %, that 0.35 mass % of 3-glycidoxypropyltrimethoxysilane (GPTMS, "KBM-403", manufactured by Shin-Etsu Chemical Co., Ltd.), 1.00 mass % of 3-trimethoxysilylpropylsuccinic anhydride ("X-12-967C" manufactured by Shin-Etsu Chemical Co., Ltd.), and 7.50 mass % of a fine silica particle dispersion were further added, that the amount of the tetraethoxysilane added was 2.60 mass %, that the amount of the titanium lactate added was 1.20 mass %, that the amount of the alcohol solvent added was 19.01 mass %, that the amount of the purified water added was 18.32 mass %, and that 0.01 mass % of acetic acid was used instead of 0.01 mass % of nitric acid.

Comparative Example A1

The preparation of a coating liquid and the fabrication of an anti-fog article were performed in the same manner as in Example A1, except that no tetraethoxysilane was added, that the amount of the titanium lactate added was 3.62 mass %, that the amount of the alcohol solvent added was 16.78 mass %, and that the amount of the purified water added was 17.08 mass %.

Comparative Example A2

The preparation of a coating liquid and the fabrication of an anti-fog article were performed in the same manner as in Example A1, except that no titanium lactate was added, that the amount of the alcohol solvent added was 18.81 mass %, and that the amount of the purified water added was 17.63 mass %.

Comparative Example A3

The preparation of a coating liquid and the fabrication of an anti-fog article were performed in the same manner as in Example A1, except that no titanium lactate was added, that the amount of the tetraethoxysilane added was 3.47 mass %, that the amount of the alcohol solvent added was 16.38 mass %, and that the amount of the purified water added was 17.63 mass %.

Comparative Example A4

The preparation of a coating liquid and the fabrication of an anti-fog article were performed in the same manner as in Example A2, except that no tetraethoxysilane was added, that the amount of the titanium lactate added was 2.41 mass %, that the amount of the alcohol solvent added was 17.05 mass %, and that the amount of the purified water added was 14.27 mass %.

Comparative Example A5

The preparation of a coating liquid and the fabrication of an anti-fog article were performed in the same manner as in Example A2, except that no titanium lactate was added, that the amount of the alcohol solvent added was 18.06 mass %, and that the amount of the purified water added was 14.63 mass %.

Comparative Example A6

In a glass container were placed 43.75 mass % of a polyvinyl acetal resin-containing solution ("S-LEC KX-5" manufactured by Sekisui Chemical Co., Ltd., having a solids content of 8 mass %, having a degree of acetalization of 9 mol %, and containing an acetal structure derived from benzaldehyde), 3.47 mass % of tetraethoxysilane (TEOS, "KBE-04" manufactured by Shin-Etsu Chemical Co., Ltd.), 11.65 mass % of a fine silica particle dispersion ("SNOW-TEX OS" manufactured by Nissan Chemical Industries, Ltd. and having a solids content of 20 mass %, the average particle diameter (primary particle diameter) being 10 μm), 26.25 mass % of an alcohol solvent ("SOLMIX AP-7" manufactured by Japan Alcohol Corporation), 14.86 mass % of purified water, 0.01 mass % of nitric acid as an acid catalyst, and 0.01 mass % of a leveling agent ("KP-341" manufactured by Shin-Etsu Chemical Co., Ltd.), which were stirred at room temperature (25° C.) for 3 hours to prepare a coating liquid for anti-fog film formation. Using this coating liquid, an anti-fog article was fabricated in the same manner as in Example A1.

Comparative Example A7

In a glass container were placed 43.75 mass % of a polyvinyl acetal resin-containing solution ("S-LEC KX-5" manufactured by Sekisui Chemical Co., Ltd., having a solids content of 8 mass %, having a degree of acetalization of 9 mol %, and containing an acetal structure derived from benzaldehyde), 5.65 mass % of tetraethoxysilane (TEOS, "KBE-04" manufactured by Shin-Etsu Chemical Co., Ltd.), 11.65 mass % of a fine silica particle dispersion ("SNOW-TEX OS" manufactured by Nissan Chemical Industries, Ltd. and having a solids content of 20 mass %, the average particle diameter (primary particle diameter) being 10 μm), 24.07 mass % of an alcohol solvent ("SOLMIX AP-7" manufactured by Japan Alcohol Corporation), 14.86 mass % of purified water, 0.01 mass % of nitric acid as an acid catalyst, and 0.01 mass % of a leveling agent ("KP-341" manufactured by Shin-Etsu Chemical Co., Ltd.), which were stirred at room temperature (25° C.) for 3 hours to prepare a coating liquid for anti-fog film formation. Using this coating liquid, an anti-fog film was formed in the same manner as in Example A1. After that, an aqueous solution containing a surfactant ("RAPISOL A-30", sodium 1,4-bis (2-ethylhexyl)sulfosuccinate, manufactured by NOF CORPORATION), which was diluted to 10 mass %, was applied to the surface of the anti-fog film, which was subjected to a heat drying process at 120° C. for 10 minutes to obtain an anti-fog article.

For Examples and Comparative Examples described above, the proportions of the components of the coating liquids to 100 parts by mass of polyvinyl acetal are shown in Table 1, and the results of evaluation of the anti-fog articles are shown in Table 2.

TABLE 1

(Parts by mass)

|  | PVA | Fine metal oxide particles (metal atom) | Silica component Derived from TEOS | Derived from GPTMS | Metal atom (Ti) contained in cross-linked structure |
|---|---|---|---|---|---|
| Example A1 | 100 | 0.0 | 6.0 | 0.0 | 2.0 |
| Example A2 | 100 | 15.0 (Si) | 6.0 | 0.0 | 2.0 |
| Example A3 | 100 | 10.0 (Nb) | 6.0 | 0.0 | 2.0 |
| Example A4 | 100 | 10.0 (Zr) | 6.0 | 0.0 | 2.0 |
| Example A5 | 100 | 1.0 (Sn) | 6.0 | 0.0 | 2.0 |
| Example A6 | 100 | 15.0 (Si) | 6.0 | 2.0 | 2.0 |
| Example A7 | 100 | 37.5 (Si) | 18.7 | 1.93 | 2.4 |
| Example A8 | 100 | 37.5 (Si) | 18.7 | 1.93 | 2.4 |
| Comparative Example A1 | 100 | 0.0 | 0.0 | 0.0 | 6.0 |
| Comparative Example A2 | 100 | 0.0 | 6.0 | 0.0 | 0.0 |
| Comparative Example A3 | 100 | 0.0 | 20.0 | 0.0 | 0.0 |
| Comparative Example A4 | 100 | 15.0 (Si) | 0.0 | 0.0 | 4.0 |
| Comparative Example A5 | 100 | 15.0 (Si) | 6.0 | 0.0 | 0.0 |

TABLE 1-continued

|  | | (Parts by mass) | | |
| --- | --- | --- | --- | --- |
|  |  | Silica component | | Metal atom (Ti) |
|  | Fine metal oxide particles | Derived from | Derived from | contained in cross-linked |
|  | PVA (metal atom) | TEOS | GPTMS | structure |
| Comparative Example A6 | 100 66.6 (Si) | 28.6 | 0.0 | 0.0 |
| Comparative Example A7 | 100 66.6 (Si) | 46.6 | 0.0 | 0.0 |

PVA: Polyvinyl acetal,
TEOS: Tetraethoxysilane,
GPTMS: Glycidoxypropyltrimethoxysilane

TABLE 2

|  | Appearance | Film thickness (Film thickness: μm) | Anti-fog properties | Repeatability of anti-fog properties | Resistance to wiping with wet cloth | Wear resistance |
| --- | --- | --- | --- | --- | --- | --- |
| Example A1 | Good | 3.9 | Good | Good | Good | Good |
| Example A2 | Good | 4.1 | Good | Good | Good | Good |
| Example A3 | Good | 4.4 | Good | Good | Good | Good |
| Example A4 | Good | 4.2 | Good | Good | Good | Good |
| Example A5 | Good | 4.0 | Good | Good | Good | Good |
| Example A6 | Good | 4.1 | Good | Good | Good | Good |
| Example A7 | Good | 3.9 | Good | Good | Good | Good |
| Example A8 | Good | 4.0 | Good | Good | Good | Good |
| Comparative Example A1 | Good | 3.8 | Good | Good | Poor | Poor |
| Comparative Example A2 | Good | 3.9 | Good | Good | Average | Good |
| Comparative Example A3 | Good | 4.2 | Average | Average | Good | Good |
| Comparative Example A4 | Good | 3.8 | Good | Good | Poor | Good |
| Comparative Example A5 | Good | 4.1 | Good | Good | Average | Good |
| Comparative Example A6 | Good | 3.1 | Poor | Poor | Good | Good |
| Comparative Example A7 | Good | 3.3 | Good | Poor | Average | Good |

<Series B: Introduction of Hydrophobic Group>

Example B1

In a glass container were placed 62.5 mass % of a polyvinyl acetal resin-containing solution ("S-LEC KX-5" manufactured by Sekisui Chemical Co., Ltd., having a solids content of 8 mass %, having a degree of acetalization of 9 mol %, and containing an acetal structure derived from benzaldehyde), 1.02 mass % of methyltrimethoxysilane (MTMS, "KBM-13" manufactured by Shin-Etsu Chemical Co., Ltd.), 3.75 mass % of a fine silica particle dispersion ("SNOWTEX OS" manufactured by Nissan Chemical Industries, Ltd., containing water as a dispersion medium, and having a solids content of 20 mass %, the average particle diameter (primary particle diameter) being 10 nm), 1.04 mass % of tetraethoxysilane (TEOS, "KBE-04" manufactured by Shin-Etsu Chemical Co., Ltd.), 1.21 mass % of titanium lactate ("ORGATIX TC-310" manufactured by Matsumoto Fine Chemical Co., Ltd.; a solution containing 44 mass % of $Ti(OH)_2[OCH(CH_3)COOH]_2$ in a mixed solvent of 2-propanol and water), 16.02 mass % of an alcohol solvent ("SOLMIX AP-7" manufactured by Japan Alcohol Corporation), 14.44 mass % of purified water, 0.01 mass % of nitric acid as an acid catalyst, and 0.01 mass % of a leveling agent ("KP-341" manufactured by Shin-Etsu Chemical Co., Ltd.), which were stirred at room temperature (25° C.) for 3 hours to prepare a coating liquid for anti-fog film formation.

Next, the coating liquid was applied to a washed float glass sheet (soda-lime silicate glass with a thickness of 3.1 mm and a size of 100×100 mm) by flow coating in an environment with a room temperature of 20° C. and a relative humidity of 30%. After drying in this environment for 10 minutes, a heating treatment (preheating) was carried out at 120° C. This was followed by a high-temperature, high-humidity treatment using the atmosphere and time as specified above, and then by an additional heat treatment using the atmosphere and time as specified above.

Example B2

The preparation of a coating liquid and the fabrication of an anti-fog article were performed in the same manner as in Example B1, except that 0.2 mass % of dimethyldiethoxysilane (DMDES, "KBE-22" manufactured by Shin-Etsu Chemical Co., Ltd.) was used instead of 1.02 mass % of methyltrimethoxysilane, and that the amount of the alcohol solvent added was 16.84 mass %.

Example B3

The preparation of a coating liquid and the fabrication of an anti-fog article were performed in the same manner as in Example B1, except that 0.15 mass % of n-hexyltrimethoxysilane (HTMS, "KBM-3063" manufactured by Shin-Etsu Chemical Co., Ltd.) was used instead of 1.02 mass % of methyltrimethoxysilane, and that the amount of the alcohol solvent added was 16.89 mass %.

Example B4

The preparation of a coating liquid and the fabrication of an anti-fog article were performed in the same manner as in Example B1, except that 0.07 mass % of n-decyltrimethoxysilane (DTMS, "KBM-3103" manufactured by Shin-Etsu Chemical Co., Ltd.) was used instead of 1.02 mass % of methyltrimethoxysilane, and that the amount of the alcohol solvent added was 16.97 mass %.

Example B5

The preparation of a coating liquid and the fabrication of an anti-fog article were performed in the same manner as in Example B1, except that 0.07 mass % of n-dodecyltrimethoxysilane (DDTMS manufactured by Tokyo Chemical Industry Co., Ltd.) was used instead of 1.02 mass % of methyltrimethoxysilane, and that the amount of the alcohol solvent added was 16.97 mass %.

Example B6

The preparation of a coating liquid and the fabrication of an anti-fog article were performed in the same manner as in Example B1, except that 0.5 mass % of fluoroalkylsilane (F8263, "Dynasylan F8263" manufactured by Evonik Degussa Japan Co., Ltd. and containing a fluoroalkyl group having 30 or less carbon atoms) was used instead of 1.02 mass % of methyltrimethoxysilane, and that the amount of the alcohol solvent added was 16.54 mass %.

Example B7

The preparation of a coating liquid and the fabrication of an anti-fog article were performed in the same manner as in Example B4, except that fine silica particles and tetraethoxysilane were not added, that the amount of the alcohol solvent added was 18.76 mass %, and that the amount of the purified water added was 17.44 mass %.

Example B8

The preparation of a coating liquid and the fabrication of an anti-fog article were performed in the same manner as in Example B4, except that the application of the coating liquid was done using a bar coater.

Example B9

The preparation of a coating liquid and the fabrication of an anti-fog article were performed in the same manner as in Example B1, except that 0.27 mass % of methyltriethoxysilane (MTES, "KBE-13" manufactured by Shin-Etsu Chemical Co., Ltd.) was used instead of 1.02 mass % of methyltrimethoxysilane, that no fine silica particle dispersion was added, that the amount of the tetraethoxysilane added was 0.69 mass %, that no titanium lactate was added, that the amount of the alcohol solvent added was 18.85 mass %, that the amount of the purified water added was 17.63 mass %, and that 0.05 mass % of nitric acid was used.

Example B10

The preparation of a coating liquid and the fabrication of an anti-fog article were performed in the same manner as in Example B1, except that 0.27 mass % of methyltriethoxysilane (MTES, "KBE-13" manufactured by Shin-Etsu Chemical Co., Ltd.) was used instead of 1.02 mass % of methyltrimethoxysilane, that no fine silica particle dispersion was added, that the amount of the tetraethoxysilane added was 0.69 mass %, that no titanium lactate was added, that the amount of the alcohol solvent added was 20.88 mass %, that the amount of the purified water added was 15.63 mass %, and that 0.01 mass % of a surface conditioner, "BYK-307" (manufactured by BYK Japan K.K.), was added.

Example B11

The preparation of a coating liquid and the fabrication of an anti-fog article were performed in the same manner as in Example B1, except that fine silica particles and titanium lactate were not added, that 0.37 mass % of n-hexyltrimethoxysilane (HTMS, "KBM-3063" manufactured by Shin-Etsu Chemical Co., Ltd.) was used instead of 1.02 mass % of methyltrimethoxysilane, that 0.01 mass % of hydrochloric acid was used instead of 0.01 mass % of nitric acid, that the amount of the alcohol solvent added was 20.44 mass %, and that the amount of the purified water added was 15.63 mass %.

Comparative Example B1

The float glass sheet used in Example B1 was evaluated per se without applying any coating liquid.

Reference Example B1

The preparation of a coating liquid and the fabrication of an anti-fog article were performed in the same manner as in Example B1, except that 0.18 mass % of tetraethoxysilane (TEOS, "KBE-04" manufactured by Shin-Etsu Chemical Co., Ltd.) was used instead of 1.02 mass % of methyltrimethoxysilane, and that the amount of the alcohol solvent added was 16.86 mass %.

Reference Example B2

The preparation of a coating liquid and the fabrication of an anti-fog article were performed in the same manner as in Example B1, except that 0.07 mass % of 3-glycidoxypropyltrimethoxysilane (GPTMS, "KBM-403" manufactured by Shin-Etsu Chemical Co., Ltd.) was used instead of 1.02 mass % of methyltrimethoxysilane, and that the amount of the alcohol solvent added was 16.97 mass %.

The unit "parts by mass" as used herein for the amount of a silica component derived from tetraethoxysilane refers to parts by mass of tetraethoxysilane calculated as $SiO_2$, the unit "parts by mass" as used herein for the amount of a silica component derived from GPTMS refers to parts by mass of GPTMS calculated as $SiO_{1.5}$, and the unit "parts by mass" as used herein for a silica component derived from a hydrophobic group-containing compound refers to parts by mass of the hydrophobic group-containing hydrolyzable silicon compound calculated as $SiO_{1.5}$ or $SiO$ depending on the number of hydrolyzable functional groups.

For Examples, Comparative Examples, and Reference Examples described above, the amounts of the components of the coating liquids per 100 parts by mass of polyvinyl acetal, etc. are shown in Table 3, and the results of evaluation of the anti-fog articles are shown in Table 4.

TABLE 3

(Parts by mass)

| | | Metal oxide component (silica component) | | | | | | |
|---|---|---|---|---|---|---|---|---|
| | | | Derived from non-hydrophobic group-containing compound | | Derived from hydrophobic group-containing | | | Cross-linked structure containing metal atom other than Si |
| | PVA | Derived from fine particles | TEOS | GPTMS | compound | Total | Hydrophobic group | Hydrophobic group-containing compound | |
| Example B1 | 100 | 15.0 | 6.0 | 0.0 | 7.80 | 28.8 | 2.25 | MTMS | Introduced |
| Example B2 | 100 | 15.0 | 6.0 | 0.0 | 1.19 | 22.19 | 0.81 | DMDES | Introduced |
| Example B3 | 100 | 15.0 | 6.0 | 0.0 | 0.76 | 21.76 | 1.24 | HTMS | Introduced |
| Example B4 | 100 | 15.0 | 6.0 | 0.0 | 0.28 | 21.28 | 0.75 | DTMS | Introduced |
| Example B5 | 100 | 15.0 | 6.0 | 0.0 | 0.25 | 21.25 | 0.82 | DDTMS | Introduced |
| Example B7 | 100 | 0.0 | 0.0 | 0.0 | 0.28 | 0.28 | 0.75 | DTMS | Introduced |
| Example B8 | 100 | 15.0 | 6.0 | 0.0 | 0.28 | 21.28 | 0.75 | DTMS | Introduced |
| Example B9 | 100 | 0.0 | 4.0 | 0.0 | 1.58 | 5.58 | 0.46 | MTES | — |
| Example B10 | 100 | 0.0 | 4.0 | 0.0 | 1.58 | 5.58 | 0.46 | MTES | — |
| Example B11 | 100 | 0.0 | 6.0 | 0.0 | 1.87 | 7.87 | 3.05 | HTMS | — |
| Reference Example B1 | 100 | 15.0 | 7.0 | 0.0 | 0.00 | 22.0 | 0.00 | — | Introduced |
| Reference Example B2 | 100 | 15.0 | 6.0 | 0.4 | 0.00 | 21.4 | 0.00 | — | Introduced |

PVA: Polyvinyl acetal,
TEOS: Tetraethoxysilane,
GPTMS: Glycidoxypropyltrimethoxysilane,
MTMS: Methyltrimethoxysilane,
DMDES: Dimethyldiethoxysilane,
HTMS: n-hexyltrimethoxysilane,
DTMS: n-decyltrimethoxysilane,
DDTMS: n-dodecyltrimethoxysilane,
FAS: Fluoroalkylsilane,
MTES: Methyltriethoxysilane

TABLE 4

(Film thickness: μm)

| | Appearance | Film thickness | Contact angle | Anti-fog properties | Resistance to wiping with dry cloth | Wear resistance |
|---|---|---|---|---|---|---|
| Example B1 | Good | 4.9 | 94 | Excellent | Good | Excellent |
| Example B2 | Good | 4.3 | 94 | Excellent | Good | Excellent |
| Example B3 | Good | 4.4 | 101 | Excellent | Good | Excellent |
| Example B4 | Good | 4.3 | 105 | Excellent | Excellent | Excellent |
| Example B5 | Good | 4.4 | 106 | Excellent | Excellent | Excellent |
| Example B6 | Good | 4.3 | 107 | Excellent | Good | Excellent |
| Example B7 | Good | 4.0 | 104 | Excellent | Good | Good |
| Example B8 | Average | 11.0 | 105 | Excellent | Excellent | Excellent |
| Example B9 | Good | 4.3 | 88 | Excellent | Good | Excellent |
| Example B10 | Good | 4.2 | 78 | Excellent | Excellent | Excellent |
| Example B11 | Good | 4.4 | 95 | Excellent | Excellent | Excellent |
| Comparative Example B1 | Good | — | 40 | Poor | — | — |
| Reference Example B1 | Good | 4.3 | 60 | Good | Average | Excellent |
| Reference Example B2 | Good | 4.4 | 62 | Good | Average | Excellent |

Incidentally, the resistance to wiping with wet cloth was rated as "Good" for both of Reference Examples B1 and B2.

The invention claimed is:

1. An anti-fogging coated transparent article, comprising a transparent article and an anti-fog film formed on the transparent article, wherein
    the anti-fog film is a single-layer film containing a water-absorbent resin, a hydrophobic group, and a metal oxide component,
    the water-absorbent resin is polyvinyl acetal,
    the anti-fog film includes at least 50% by mass of the water-absorbent resin,
    the hydrophobic group is a linear alkyl group having 6 to 14 carbon atoms, and
    the hydrophobic group is bonded directly to a metal atom of the metal oxide component.

2. The anti-fogging coated transparent article according to claim 1, wherein the anti-fog film contains the metal oxide component in an amount of 0.1 to 60 parts by mass per 100 parts by mass of the water-absorbent resin.

3. The anti-fogging coated transparent article according to claim 1, wherein a water contact angle on a surface of the anti-fog film is 70 degrees or more as measured for 4 mg of a water droplet placed on the surface.

4. The anti-fogging coated transparent article according to claim 1, wherein the anti-fog film contains the hydrophobic group in an amount of 0.05 to 10 parts by mass per 100 parts by mass of the water-absorbent resin.

5. The anti-fogging coated transparent article according to claim 1, wherein the polyvinyl acetal contains an acetal structure derived from an aromatic aldehyde.

6. The anti-fogging coated transparent article according to claim 1, wherein the anti-fog film contains a cross-linked structure derived from at least one cross-linker selected from an organoboron compound, an organotitanium compound, and an organozirconium compound.

7. The anti-fogging coated transparent article according to claim 6, wherein the anti-fog film contains a cross-linked structure derived from titanium lactate added to a coating liquid for forming the anti-fog film.

8. The anti-fogging coated transparent article according to claim 1, wherein at least a portion of the metal oxide component is in the form of fine metal oxide particles.

9. The anti-fogging coated transparent article according to claim 1, wherein
at least a portion of the metal oxide component is a metal oxide component derived from a hydrolyzable metal compound, or a hydrolysate of the hydrolyzable metal compound, added to a coating liquid for forming the anti-fog film, and
the hydrolyzable metal compound is at least one selected from: (a) a hydrolyzable metal compound having the hydrophobic group; and (b) a hydrolyzable metal compound that does not have the hydrophobic group.

10. The anti-fogging coated transparent article according to claim 1, wherein
the metal oxide component comprises: a metal oxide component derived from fine metal oxide particles added to a coating liquid for forming the anti-fog film; and a metal oxide component derived from a hydrolyzable metal compound, or a hydrolysate of the hydrolyzable metal compound, added to the coating liquid, and
the hydrolyzable metal compound is at least one selected from: (a) a hydrolyzable metal compound having the hydrophobic group; and (b) a hydrolyzable metal compound that does not have the hydrophobic group.

11. The anti-fogging coated transparent article according to claim 9, wherein (b) the hydrolyzable metal compound that does not have the hydrophobic group comprises at least one selected from a tetraalkoxysilane and a silane coupling agent.

12. The anti-fogging coated transparent article according to claim 1, wherein the metal oxide component is a silica component, and the anti-fog film further contains a metal atom other than a silicon atom.

13. An anti-fogging coated transparent article, comprising a transparent article and an anti-fog film formed on the transparent article, wherein
the anti-fog film is a single-layer film containing a water-absorbent resin, a hydrophobic group, and a metal oxide component,
the water-absorbent resin is polyvinyl acetal,
the content of the water-absorbent resin in the anti-fog film is 50 mass % or more,
the hydrophobic group is at least one selected from: (1) a chain or cyclic alkyl group having 3 to 30 carbon atoms; and (2) a chain or cyclic alkyl group having 1 to 30 carbon atoms in which at least one hydrogen atom is substituted by a fluorine atom,
the hydrophobic group is bonded directly to a metal atom of the metal oxide component,
the metal oxide component is a silica component, and
the hydrophobic group and the silica component forms a component represented by the following formula:

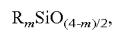

where R is the hydrophobic group and m is an integer of 1 to 3.

14. The anti-fogging coated transparent article according to claim 13, wherein
the anti-fog film contains the metal oxide component in an amount of 5.58 to 60 parts by mass per 100 parts by mass of the water-absorbent resin, and
a water contact angle on a surface of the anti-fog film is 70 degrees or more as measured for 4 mg of a water droplet placed on the surface.

15. The anti-fogging coated transparent article according to claim 13, wherein the hydrophobic group is a methyl group or an ethyl group, and a water contact angle on a surface of the anti-fog film is 70 degrees or more as measured for 4 mg of a water droplet placed on the surface.

16. The anti-fogging coated transparent article according to claim 13, wherein the anti-fog film contains the hydrophobic group in an amount of 0.05 to 10 parts by mass per 100 parts by mass of the water-absorbent resin.

17. The anti-fogging coated transparent article according to claim 13, wherein the polyvinyl acetal contains an acetal structure derived from an aromatic aldehyde.

18. The anti-fogging coated transparent article according to claim 13, wherein the anti-fog film contains a cross-linked structure derived from at least one cross-linker selected from an organoboron compound, an organotitanium compound, and an organozirconium compound.

19. The anti-fogging coated transparent article according to claim 18, wherein the anti-fog film contains a cross-linked structure derived from titanium lactate added to a coating liquid for forming the anti-fog film.

20. The anti-fogging coated transparent article according to claim 13, wherein at least a portion of the metal oxide component is in the form of fine metal oxide particles.

21. The anti-fogging coated transparent article according to claim 13, wherein the anti-fog film further contains a metal atom other than a silicon atom.

22. An anti-fogging coated transparent article, comprising a transparent article and an anti-fog film formed on the transparent article, wherein
the anti-fog film is a single-layer film containing a water-absorbent resin, a hydrophobic group, and a metal oxide component,
the water-absorbent resin is polyvinyl acetal,
the content of the water-absorbent resin in the anti-fog film is 50 mass % or more,
the hydrophobic group is a chain or cyclic alkyl group having 1 to 30 carbon atoms in which at least one hydrogen atom is optionally substituted by a fluorine atom,
the hydrophobic group is bonded directly to a metal atom of the metal oxide component, the anti-fog film contains the metal oxide component in an amount of 5.58 to 60 parts by mass per 100 parts by mass of the water-absorbent resin, and
a water contact angle on a surface of the anti-fog film is 70 degrees or more as measured for 4 mg of a water droplet placed on the surface.

23. The anti-fogging coated transparent article according to claim 22, wherein the hydrophobic group is at least one selected from: (1) a chain or cyclic alkyl group having 3 to 30 carbon atoms; and (2) a chain or cyclic alkyl group having 1 to 30 carbon atoms in which at least one hydrogen atom is substituted by a fluorine atom.

24. The anti-fogging coated transparent article according to claim 22, wherein the hydrophobic group is a methyl group or an ethyl group.

25. The anti-fogging coated transparent article according to claim 22, wherein the anti-fog film contains the hydrophobic group in an amount of 0.05 to 10 parts by mass per 100 parts by mass of the water-absorbent resin.

26. The anti-fogging coated transparent article according to claim 22, wherein the polyvinyl acetal contains an acetal structure derived from an aromatic aldehyde.

27. The anti-fogging coated transparent article according to claim 22, wherein the anti-fog film contains a cross-linked structure derived from at least one cross-linker selected from an organoboron compound, an organotitanium compound, and an organozirconium compound.

28. The anti-fogging coated transparent article according to claim 27, wherein the anti-fog film contains a cross-linked structure derived from titanium lactate added to a coating liquid for forming the anti-fog film.

29. The anti-fogging coated transparent article according to claim 22, wherein at least a portion of the metal oxide component is in the form of fine metal oxide particles.

30. The anti-fogging coated transparent article according to claim 22, wherein the metal oxide component is a silica component, and the anti-fog film further contains a metal atom other than a silicon atom.

* * * * *